(12) United States Patent
Ravi et al.

(10) Patent No.: US 10,344,544 B2
(45) Date of Patent: Jul. 9, 2019

(54) ENGINEERING METHODOLOGY TO TREAT SEVERE LOSS ZONES WITH THIXOTROPIC CEMENT SYSTEM

(71) Applicant: Halliburton Energy Services, Inc., Houston, TX (US)

(72) Inventors: Krishna M. Ravi, Kingwood, TX (US); Rahul Chandrakant Patil, Pune (IN); Sandip Prabhakar Patil, Pune (IN); Siva Rama Krishna Jandhyala, Pune (IN); Ravinder Gahlawat, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/556,601

(22) PCT Filed: Apr. 7, 2015

(86) PCT No.: PCT/US2015/024730
§ 371 (c)(1),
(2) Date: Sep. 7, 2017

(87) PCT Pub. No.: WO2016/163996
PCT Pub. Date: Oct. 13, 2016

(65) Prior Publication Data
US 2018/0051528 A1 Feb. 22, 2018

(51) Int. Cl.
*E21B 21/00* (2006.01)
*C09K 8/50* (2006.01)
*C09K 8/42* (2006.01)
*C09K 8/487* (2006.01)

(52) U.S. Cl.
CPC ............ *E21B 21/003* (2013.01); *C09K 8/428* (2013.01); *C09K 8/487* (2013.01); *C09K 8/50* (2013.01); *C09K 8/42* (2013.01)

(58) Field of Classification Search
None
See application file for complete search history.

(56) References Cited

U.S. PATENT DOCUMENTS

| | | | |
|---|---|---|---|
| 4,547,298 A * | 10/1985 | Novak | C04B 14/36 166/294 |
| 2003/0195120 A1* | 10/2003 | Halliday | C09K 8/16 507/140 |

(Continued)

FOREIGN PATENT DOCUMENTS

| CA | 1217326 | 2/1987 |
|---|---|---|
| CA | 2775996 | 4/2011 |
| WO | WO-2014008191 A1 | 1/2014 |

OTHER PUBLICATIONS

Barnes, "Thixotropy—a Review," J Non-Newtonian Fluid Mechanics, vol. 70, May 1997, pp. 1-33.

(Continued)

*Primary Examiner* — Anuradha Ahuja
(74) *Attorney, Agent, or Firm* — Thomas Rooney; C. Tumey Law Group PLLC

(57) ABSTRACT

A method of treating lost circulation issues stemming from loss zones during the drilling and cementing process through the utilization of a thixotropic cement. The method comprises the steps of encountering a loss zone in a bore hole during drilling or running casing and pumping a treatment fluid into the loss zone, wherein the treatment fluid is a gel capable of gelling, breaking when sheared, and building back shear strength after shearing is removed.

17 Claims, 4 Drawing Sheets

(56) References Cited

U.S. PATENT DOCUMENTS

| | | |
|---|---|---|
| 2005/0126781 A1 | 6/2005 | Reddy et al. |
| 2010/0132948 A1 | 6/2010 | Fu et al. |
| 2012/0043459 A1 | 2/2012 | Hill et al. |
| 2013/0118235 A1 | 5/2013 | Morgan et al. |
| 2013/0220620 A1* | 8/2013 | Jamison .................. E21B 43/26 166/308.5 |
| 2014/0190696 A1* | 7/2014 | Iverson .................. C04B 28/18 166/293 |

OTHER PUBLICATIONS

Davidson et al., "Control of Lost Circulation in Fractured Limestone Reservoirs," IADC/SPE 62734, 2000 Asia Pacific Drilling Technology held in Kuala Lumpur, Malaysia, 9 pages.

Fidan et al., "Use of Cement as Lost Circulation Material—Field Case Studies," IADC/SPE 88005, 2004 Asia Pacific Drilling Technology Conference and Exhibition, 9 pages.

Whitfill et al., "New Design Models and Materials Provide Engineered Solutions to Lost Circulation," SPE 101693, 2006 SPE Russian Oil and Gas Technical Conference and Exhibition held in Moscow, Russia, 14 pages.

International Search Report and Written Opinion from PCT/US2015/024730, dated Jan. 4, 2016, 14 pages.

Canadian Examination Report for Application No. 2,978,056 dated Aug. 1, 2018.

Office Action from Canadian Patent Application No. 2,978,056 dated Feb. 26, 2019.

Nelson, E.B., "Well Cementing", Developments in Petroleum science, 28, pp. 4, Sections 6-12.4 and 7-2, 1990.

* cited by examiner

ENGINEERING METHODOLOGY TO TREAT SEVERE LOSS ZONES WITH THIXOTROPIC CEMENT SYSTEM

BACKGROUND

The present disclosure relates to a method of treating lost circulation issues stemming from loss zones during the drilling and cementing process through the use of a thixotropic cement.

Lost circulation is a well-known industry problem that may result in non-productive time during drilling and cementing and/or the loss of drilling and cementing fluids to the surrounding formation. Lost circulation is the partial or complete loss of drilling fluid or cement slurries into formation voids during drilling, circulation, running casing or cementing operations. Estimates show that these types of losses occur during drilling on approximately 20-25% of wells worldwide. Such losses can be extremely expensive and troublesome, resulting in lost rig time, stuck pipe, blow-outs and sometimes the outright abandonment of expensive wells. These losses also cause reduced production and lost man-hours among other things.

Lost circulation problems can happen at any depth and can occur when the total pressure exerted against the formation exceeds the formation breakdown pressure or when there are sizeable fractures or fissures connecting the wellbore to the surrounding formation. Lost circulation problems are generally caused by four types of formations: 1) natural or induced fractured formations; 2) vugular or cavernous formations; 3) highly permeable formations; and 4) unconsolidated formations. These formations can be aggravated upon drilling or due to severe loads applied during drilling on weak formations having a low fracture gradient. These formations can cause many levels of losses depending on their size and location.

One method of addressing lost circulation is to add sized particulate matter to the fluid being placed into the formation with the expectation that properly sized particulates will then block fissures, pore face, or other openings for the wellbore to the surrounding formation. However, such particulate solutions are best suited for wellbores in locations where relatively minor losses are seen. Wellbores experiencing moderate to severe losses are less emendable to a sized particulate solution. Furthermore, losses that are treated during drilling can sometimes resume during cementing due when, for example, a cement with higher density than drilling fluid is used.

The usual procedure to treat moderate to severe losses during drilling is to pump a batch of lost circulation material (LCM) fluid, often called an LCM pill. This pill fills the crevices of the loss zone and may also provide wellbore strengthening to enable further drilling. However, in case of severe losses, even such a pill treatment may not be effective. In such cases, chemical solutions like polymers, viscofiers, foams, polyurethanes, calcium carbonates and cross-linked gels have been suggested. However, such chemical solutions may be inconsistent to apply and tend to vary based on the well temperature. Moreover, they can be difficult to place, requiring expertise to ensure that the correct area surrounding the wellbore is treated. There is a need for a methodology with a greater degree of success and consistency in treating loss zones.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

Figure 1:
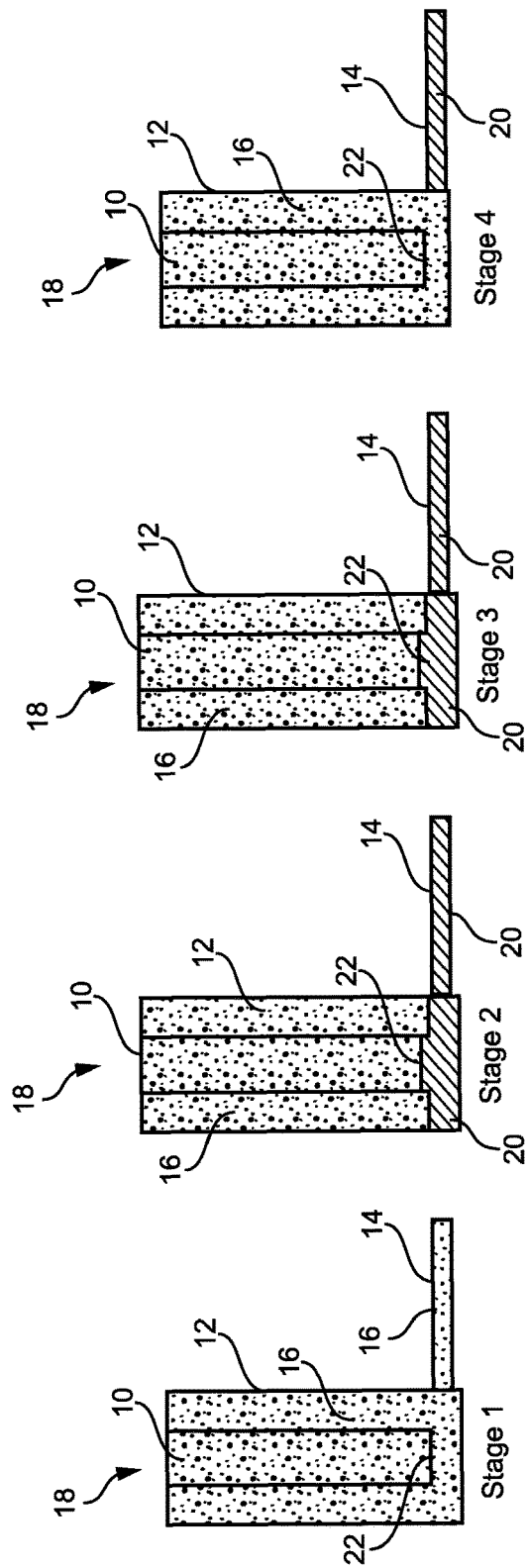
FIG. 1 illustrates the sequence of operational steps in performing an embodiment of the present method.

The present disclosure relates to a method of treating a loss zone during drilling or running casing. The method generally comprises the steps of encountering a loss zone in a wellbore during drilling or running casing and pumping a treatment fluid into the loss zone. The treatment fluid is a gel capable of gelling, breaking when sheared, and building back shear strength after shearing is removed.

To facilitate a better understanding of the present disclosure, the following examples of preferred or representative embodiments are given. In no way should the following examples be read to limit, or to define, the scope of the disclosure.

The present disclosure provides a reliable approach to treat severe losses by using a thixotropic cement system that comprises a specialized treatment fluid. In some embodiments, a suitable specialized treatment fluid has density less than about 11 pounds per gallon and may contain polymers, cement, clay, stabilizers, and/or fibrous fillers. This specialized treatment fluid is able to gel rapidly and, once it is in gel form, its viscosity is reduced (broken) when subjected to shear. After shear is removed, the treatment fluid builds back gel strength quickly. This process can be repeated multiple times, and mechanical strength builds over time.

In shorthand, the mechanism behind the functioning of a thixotropic cement system is as follows. During circulation (placement or pumping), it behaves as an ordinary cement system with low enough viscosities to allow the treatment fluid to flow effectively into the loss zone. One advantage to using this type of treatment fluid is that since it is a thixotropic fluid, it is relatively easy to place and its flow stops very quickly after placement. In addition, once the treatment fluid stops flowing, it immediately begins to build compressive strength. There are many different methods for placement of this type of treatment fluid. For example, the placement of this type of thixotropic fluid typically occurs in the form of a squeeze process. Squeeze can occur at once in case of a running or a walking squeeze or can occur in stages in the case of a hesitation squeeze. During a walking or running squeeze, the entire targeted volume is placed into the loss zone at once. During a hesitation squeeze, a predefined volume is placed into the loss zone followed by a waiting period, after which there is another placement period. This cycle continues until the entire targeted volume is placed. Regardless of the type of squeeze, the overall process remains the same. After placement in loss zone, the treatment fluid placed in the loss zone has a tendency to flow for a brief period under the effect of annular hydrostatic column pressure above the loss zone. This phase can be qualified as the quasi-static or no-flow period depending on the shear rates experienced by the treatment fluid placed in the loss zone. During this low shear rate or no-flow period, the treatment fluid rapidly builds gel strength due to its thixotropic behavior, thus avoiding further flow into the loss zone. Additionally, because a cement based treatment fluid is used in the process, after the static period described above, it also builds compressive strength resulting in wellbore strengthening. This system works over a wide range of densities, temperatures and loss sizes and is more consistent in treating losses than prior art methods. To provide additional wellbore strengthening, conventional cement may be pumped into loss zones behind the treatment fluid, if desired.

FIG. 1 shows the sequence of operational steps for the above mechanism. The drill string 10, open hole 12, and lost circulation zones 14 are shown. In Stage 1, drilling fluid 16 occupies both the loss zone 14 and the wellbore 18. In Stage 2, treatment fluid 20 is pumped into the loss zone 14. Stage 3 is the static period where the gel strength of the treatment fluid 20 is allowed to build-up under the influence of annular hydrostatic pressure above the loss zone 14. Here, quasi-static or a no-flow condition may be observed in the loss zone 14 depending on the rate of gel strength build-up, volume of treatment fluid in the loss zone and the level of annular hydrostatic pressure. In Stage 4, residual treatment fluid 20 and mud are recirculated after the desired static time is allowed for gel strength build-up.

The use of treatment fluid to treat loss zones is not without risks. By virtue of the thixotropic mechanism, there is a risk of the treatment fluid setting in the wellbore and/or drill pipe, especially when the treatment fluid cannot be pushed out of drill string completely, due to either pump failure or inaccurate volume predictions. Therefore, engineering calculations are necessary to determine the maximum gel strength build-up allowed to avoid hard setting. These maximum gel strengths are dependent on the location of the loss zone, the loss zone's geometry, the rate of loss, the annular hydrostatic pump pressure, the pump pressure and the temperature. This in-turn provides a recommendation of maximum downtime (in case the pump is down, such as when there is treatment fluid left in the drill string).

Other calculations and projections should be made before the treatment process begins as well. Pressure for recirculation of the residual treatment fluid in the tubular and annulus after a successful placement job should be determined to ensure that recirculation is possible. The rheology of the treatment fluid system should be tuned to allow easy placement. Additional static time should be accounted in case there is a need to swap the rig and the cement pumps and also in case pumping treatment fluid through the bottom hole assembly is not allowed and thus a tripping time is involved. Rheological parameters should consider the above four criteria. The amount of treatment fluid needed to fill the loss zones effectively should be determined. This depends on the size of losses and the depth at which these losses are encountered. Depending on the need for a temporary or a permanent plug, the system may need to be designed to dissolve in acid.

Figure 2A:
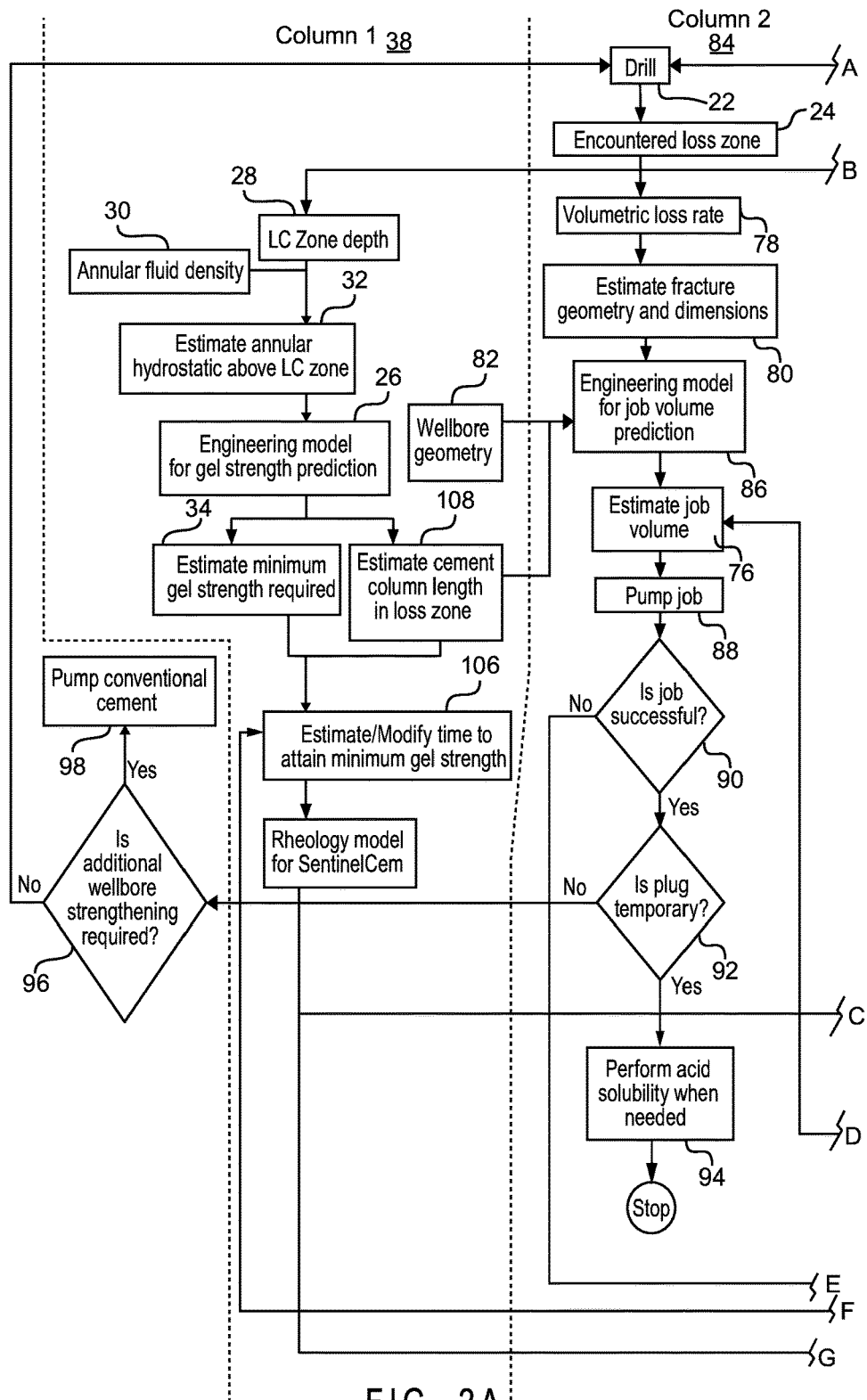
FIG. 2A is the first half of a flow chart illustrating the decision steps and procedural steps of an embodiment of the present method.
Figure 2B:
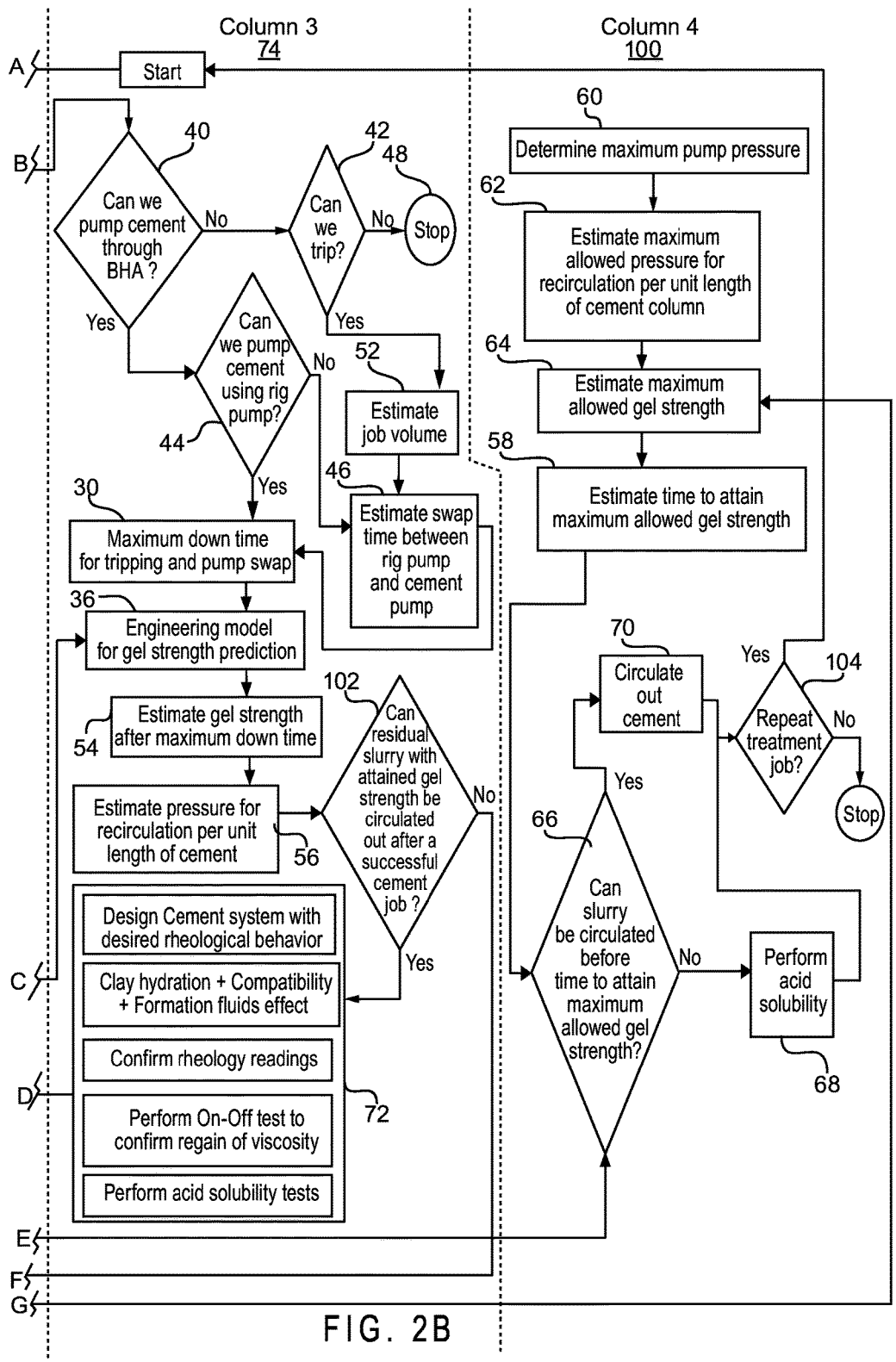
FIG. 2B is the second half of a flow chart illustrating the decision steps and procedural steps of an embodiment of the present method.

The description of the entire process including the above-referenced calculations and projections will be described with reference to the flow chart in FIGS. 2A and 2B, with continuing reference to FIG. 1. In FIGS. 2A and 2B, the letters "A", "B", "C", "D", "E", "F" and "G" represent the continuation of the labeled lines from FIG. 2A to FIG. 2B and vice versa. The process begins with drilling 22. Once a loss zone is encountered 24, there are four major steps in the workflow: (i) First, the rheology model must be determined to represent the thixotropic cement system, (ii) Second, the pressure for recirculation in case of a down time is determined, (iii) Third, the cement system is designed and tested, including its acid solubility, (iv) Finally, the job volume required to place the cement system in the loss zone effectively is determined and the loss zone treatment job is performed.

The job of the rheology model is twofold: to establish the functional relationship between shear rate and viscosity during flow regime and to establish the relationship between gel strength and time during quasi-static or no-flow regime. The acceptable window of viscosity vs. shear rate for cement systems during pumping is fairly wide and is not the deterministic component of the rheology model. Rather, the gel strength build-up over time is the deterministic component and should meet the following requirements.

A minimum value of gel strength per unit length of the treatment fluid column is needed at the end of the static period such that the treatment fluid in the loss zone will not experience significant flow due to the annular hydrostatic column pressure above the loss zone in which this treatment fluid will be placed during the static condition (Stage 3 in FIG. 1) in order to avoid further losses. The process of converting gel strength to equivalent pressure and analyzing whether flow occurs during the static period under the hydrostatic pressure effect is referenced as "engineering model for gel strength prediction" 26 in the workflow shown in FIG. 2A. In order to perform this engineering model, the loss zone depth 28 and annular fluid density 30 are required to determine the annular hydrostatic pressure 32 above the loss zone. The end of placement of the treatment fluid 20 is the beginning of this static period. The treatment fluid 20 has been at a velocity corresponding to the flow rate during placement. From this velocity, the fluid 20 will attain a zero velocity in a finite time due to the fact that the gel strength increases with time and thus the resistance to flow increases with time. However, the driving force, which is the annular hydrostatic pressure, does not increase with time. One needs to solve the force balance equation on the treatment fluid 20 inside the loss zone 14 to predict when the velocity will be zero. This engineering model 26 performs calculations that could be analytical or based on a computational fluid dynamics simulation with no convection and under the action of hydrostatic pressure with a time changing rheology of the treatment fluid column 108 in the loss zone.

Once the time needed to attain this minimum gel strength 34 is calculated 106, along with the viscous part, the rheological model 36 is considered defined. This process is defined under the first column 38 in the workflow shown in FIG. 2A. A gel strength build-up rate is now defined. For example, if the strength of an exemplary treatment fluid increased from 100 lbf/100 ft$^2$ to 500 lbf/100 ft$^2$ in 11 minutes, the gel strength build-up rate is 36.36 lbf/100 ft$^2$/min. Any standard rheological method can also be used to determine this gel strength build-up rate for the treatment fluid.

Next, two operational decisions must be considered: whether it is possible to pump through the bottom hole assembly 40 or remove the drill string 10 completely from the wellbore 18 in a process called "tripping out," 42 and whether it is necessary to swap between the rig pump and the cement pump 44. If it is determined that pumping through the bottom hole assembly is possible, the next step is to determine whether the treatment fluid can be pumped thorough the rig pump. If that is not possible, the time needed to swap the rig and cement pumps must be calculated 46. Alternatively, if treatment fluid cannot be pumped through the bottom hole assembly, it must be determined whether tripping is possible 42. If tripping is not possible, the process must be stopped 48 and a different method for treating the loss zone must be considered. If tripping is possible, the tripping time must be estimated as well as the estimated job volume 52. These processes may give rise to additional static time 50. Depending on the gel strength build-up rate calculated above, one can determine the maximum gel strength at the end of this additional static time 54. This maximum gel strength should be such that the pressure required to circulate out the residual treatment fluid 56 in the drill pipe and in the annulus should not exceed the pump pressure rating or damage the formation further.

The steps described above are iterative and eventually will define the rheological model.

Mathematically, this rheological behavior can be represented using the constitutive relation of Herschel-Bulkley fluid model with time varying yield stress as follows:

$$\tau = \tau_0 + K\dot{\gamma}^n \text{ when } \dot{\gamma} > \dot{\gamma}_c$$

$$\tau = (\tau_{HB} + \lambda(t - t_0)) + K\dot{\gamma}^n \text{ when } \dot{\gamma} \leq \dot{\gamma}_c$$

Here, $\tau$ is the shear stress, $\tau_{HB}$ is the yield stress obtained from the traditional low shear rate dial reading from a FANN 35 or an equivalent rheometer, K is the consistency index, n is the flow index, $\dot{\gamma}$ is the shear rate, $\lambda$ is the rate of gel strength build-up during quasi-static or no-flow condition, $\dot{\gamma}_c$ is the user defined very low shear rate (i.e. 3 rpm reading on Fann 35) which separates the flow regime from a quasi-static or no-flow regime, t is the clock time and $t_0$ is the clock time at which static period has started (Stage 3 in FIG. 1). This is an explicit representation of rheological parameters as a function of time.

Other order parameter based models and empirical models are available to represent time dependent rheological behavior of fluids. In principle, any rheological model that represents the three essential features qualified below can be used to represent the fluid: (i) for a given shear rate, viscosity decreases with an increase in time to attain a steady-state viscosity value, (ii) with an increase in shear rate, the viscosity decreases and vice-versa, and (iii) during quasi-static or no-flow, the yield stress increases with time.

The next step in the process is to determine the pressure needed for recirculation of the treatment fluid if the placement of the treatment fluid fails. If the treatment fluid placement is not successful due to pump failure or any other reason, treatment fluid may remain in the drill pipe, in the annulus or in both of them. Based on the rheology model defined using the procedure above, one can estimate the gel strength build-up with time 58. This in-turn determines the pressure required for breaking the treatment fluid and establishing recirculation by solving the engineering model for gel strength prediction.

Also, the maximum amount of time for which such a scenario is allowed will depend on the maximum pressure rating of the pump 60 above which it cannot recirculate cement or the maximum pressure that can be exerted without fracturing the formation 62. Based on the rheology model, one can estimate the ultimate gel strength 64 and the time to attain ultimate gel strength 58 such that the pressure drop offered by the treatment fluid is equal to the pump pressure rating or the formation fracture pressure. If this amount of downtime is expected, the treatment fluid must be recirculated or chemically treated to break the treatment fluid. This determination is illustrated in the fourth column 100 of the workflow shown in FIG. 2B. First, the maximum pump pressure is determined. Next, the maximum allowed pressure for recirculation per unit length of the treatment fluid column is estimated. Next, the maximum allowed gel strength is estimated as well as the time to attain that maximum allowed gel strength. From these estimations, it can be determined whether the treatment fluid can be recirculated before the maximum gel strength is attained 66. The cement is recirculated if possible 70. If it cannot, an acid solubility test must be performed 68 to determine how long it will take to break the treatment fluid. If it can be recirculated, it is determined whether the job must be repeated 104 to adequately treat the loss zone 14

Figure 3:
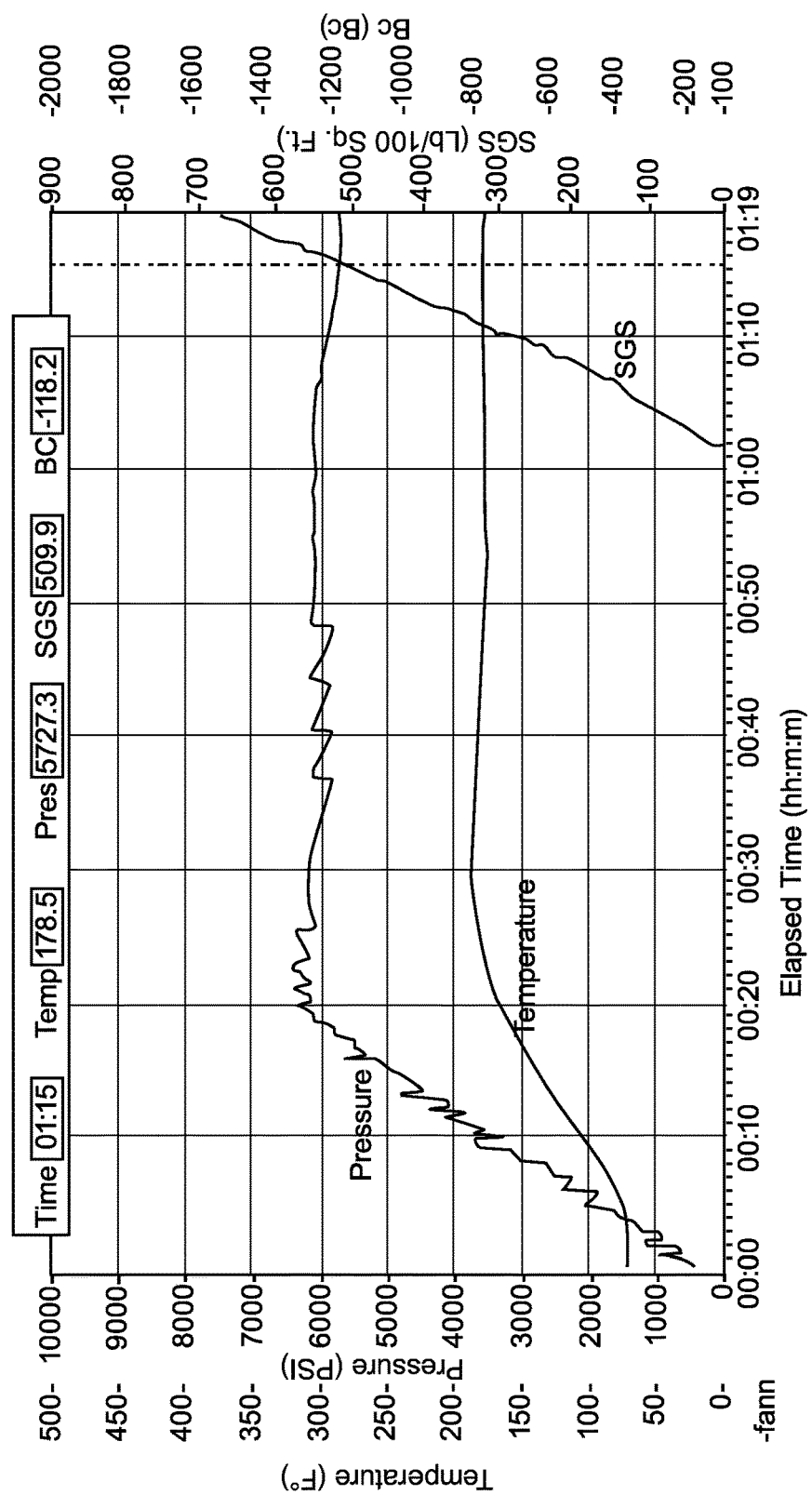
FIG. 3 illustrates an exemplary output graph of rheological test results.

The next step in the process is to design and test the thixotropic cement system 72. During treatment fluid design, the treatment fluid composition is determined in order to give the desired rheological model. Confirmatory tests should be performed to ensure the required rheological behavior is obtained. These tests include the standard FANN 35 or equivalent tests, or an on-off test using a HPHT consistometer or its equivalent. The on-off test involves mixing the treatment fluid at 150 rpm for a period of time and then going static for a short while after which the mixing is started again. This cycle is repeated a number of times. An exemplary output graph is shown in FIG. 3. The spikes in viscosity represent the gel strength build-up and the following plateau represents regained viscosity after breaking the built treatment fluid. While the engineering model predicts the pressure to break circulation, this on-off test confirms whether the treatment fluid will regain sufficient viscosity, once the circulation is broken, such that it can be pumped. The lost circulation treatment can be temporary or permanent. If it is designed to be temporary, it is necessary to dissolve the set treatment fluid using acid. In such scenarios, an acid solubility test should also be performed on the set cement. This entire process of confirming rheology readings, performing on-off tests and acid solubility is shown in lower half of the third column 74 of FIG. 2B.

Finally, the volume of treatment fluid needed for the job must be determined 76. Given the volumetric loss rate 78 estimated during drilling, the approximate geometry 80 of the loss zone 14 may be determined using the vertical stress gradients, mud weight used and the stress-strain constitutive relations. Using the representative geometry of the borehole 82, the drill string and the loss zone, computational fluid dynamics simulations or other suitable methods can be performed in which the mud can be displaced with the treatment fluid and the fluid fronts are tracked. These simulations require the rheological models of thixotropic fluid in the flow regime and also the rheological model of the drilling fluid. The simulation output is an estimate of the volume of the treatment fluid needed to occupy a predetermined length of the crevice in the loss zone. This process is described in the second column 84 in workflow FIG. 2A. A representative figure before and after pumping the treatment fluid is shown in Stages 1 and 2 respectively of FIG. 1. This process of determining job volume using computational fluid dynamic simulations is referenced as "engineering model for job volume prediction" 86 in the workflow shown in FIG. 2A.

In summary, the job volume is obtained from the engineering model for job volume prediction 86. Rheological model and pressure for recirculation are obtained from the engineering model for gel strength prediction 36. Treatment fluid design and treatment fluid testing are performed on finalized treatment fluid 72. The treatment fluid job is then performed 88 to treat the loss zone 14.

If the treatment fluid job is successful 90 in filling and stabilizing the loss zone, desired static time is maintained and the wellbore fluids are then recirculated 102. A decision is made whether the treatment is desired to be permanent or temporary 92. If the lost circulation treatment is desired to be temporary, it is later dissolved by treating with acid 94. If the treatment is permanent it may be left in place and, where additional wellbore strengthening is desired 96, conventional cement can be pumped 98 after the treatment fluid placement in the loss zone.

If there are operational problems during the job requiring treatment fluid to be circulated out the following procedure is performed. The previously described engineering model for gel strength prediction has provided the maximum allowed downtime within which the wellbore fluids should be recirculated to prevent the treatment fluid from reaching maximum allowable gel strength. If for any reason this maximum allowed downtime is exceeded, acid treatment should be performed to break the treatment fluid and allow for easy recirculation of treatment fluid from the wellbore. This is an alternative method to overcome operational problems if recirculation fails. Acid solubility tests should be performed on the treatment fluid a priori to check its ability to dissolve after setting.

Operationally, acid solubility of a long treatment fluid column is what is relevant. The length of treatment fluid column acidized will be a function of differential pressure, geometry of the column, time of exposure to acid, concentration of acid and nature of the treatment fluid. Scaling analysis can be used to scale down the above variables to represent downhole conditions. Based on this analysis, spiraling pipe geometry with a predetermined length and diameter can be used for this testing. This pipe will be filled with the treatment fluid and the treatment fluid is allowed to set for the desired time. Then, acid is pumped with a calculated constant pressure differential across the pipe for predetermined time. The length of treatment fluid column acidized is measured. By scale up of the lab results, acid dissolution possible in wellbore conditions can be estimated.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method of treating a loss zone during drilling or running casing, the method comprising the steps of:
   (1) encountering the loss zone in a bore hole during the drilling or running casing;
   (2) determining a rheology model of a thixotropic cement system, wherein the rheology model comprises a relationship between shear rate and viscosity during a flow regime of the thixotropic cement system and a relationship between gel strength and time during a quasi-static or no-flow regime of the thixotropic cement system, wherein the step of determining the rheology model of the thixotropic cement system comprises the steps of:
      (a) determining a required minimum gel strength of the thixotropic cement system;
      (b) determining an amount of time needed to reach the required minimum gel strength;
      (c) determining a maximum gel strength of the thixotropic cement system;
      (d) determining an amount of time needed to reach the maximum gel strength of the thixotropic cement system;
      (e) determining a maximum pressure output of a pump;
      (f) determining a required pressure level needed to circulate the thixotropic cement system;
      (g) confirming that the thixotropic cement system can be recirculated before the maximum gel strength is reached; and
      (h) determining a volume of the thixotropic cement system required to fill the loss zone;
   (3) designing and testing the thixotropic cement system to confirm adherence to the determined rheology model;
   (4) pumping the designed and tested thixotropic cement system into the loss zone, wherein the thixotropic cement system is a gel and (i) gels (ii) breaks when sheared and (iii) builds back shear strength after shearing is removed.

2. The method of claim 1, wherein the thixotropic cement system repeatedly (i) gels (ii) breaks when sheared and (iii) builds back shear strength after shearing is removed.

3. The method of claim 1, wherein the minimum gel strength is a point at which the thixotropic cement system in the bore hole does not experience flow due to hydrostatic column pressure above the loss zone.

4. The method of claim 1, wherein the maximum gel strength is a point at which the thixotropic cement system cannot be recirculated in a drill string or in the bore hole.

5. The method of claim 1, wherein the step of determining the volume of the thixotropic cement system required to fill the loss zone comprises the steps of: measuring a volumetric loss rate of drilling fluid in the bore hole; and estimating a fracture geometry and dimensions of the loss zone.

6. The method of claim 1, further comprising the step of confirming that the thixotropic cement system can be pumped through a bottom hole assembly of a drilling rig before the step (4) of pumping the thixotropic cement system into the loss zone.

7. The method of claim 6, further comprising the step of confirming that tripping is possible before the step (4) of pumping the thixotropic cement system into the loss zone.

8. The method of claim 7, further comprising the steps of: estimating a tripping time before the step (4) of pumping the thixotropic cement system into the loss zone; and estimating an amount of time necessary to swap out a cement pump for a rig pump before the step (4) of pumping the thixotropic cement system into the loss zone.

9. The method of claim 8, further comprising: before the step (4) of pumping the thixotropic cement system into the loss zone, estimating a maximum down time allowable before the thixotropic cement system reaches the maximum gel strength.

10. The method of claim 9, further comprising: incorporating the maximum down time allowable into the rheology model.

11. The method of claim 1, further comprising: determining acid solubility of the thixotropic cement system; stopping flow of the thixotropic cement system once it has filled the loss zone; and determining whether a plug formed by the thixotropic cement system is permanent.

12. A method of treating a loss zone in a bore hole during drilling with a thixotropic cement system, the method comprising the steps of:
   (1) drilling with a drilling fluid until encountering the loss zone;
   (2) determining a rheology model of the thixotropic cement system, wherein the rheology model comprises a relationship between shear rate and viscosity during a flow regime of the thixotropic cement system and a relationship between gel strength and time during a quasi-static or no-flow regime of the thixotropic cement system, wherein the step of determining the rheology model of the thixotropic cement system comprises the steps of:
      (a) measuring a volumetric loss rate of the drilling fluid in the bore hole;
      (b) estimating a fracture geometry and dimensions of the loss zone;
      (c) measuring a depth of the loss zone;
      (d) measuring an annular fluid density;
      (e) estimating an annular hydrostatic pressure above the loss zone;
      (f) estimating a minimum gel strength of the thixotropic cement system, wherein the minimum gel strength is a point at which the thixotropic cement system in the bore hole does not experience flow due to hydrostatic column pressure above the loss zone;
      (g) estimating a column length of the thixotropic cement system in the loss zone;
      (h) estimating a maximum pump pressure;
      (i) estimating a maximum allowed pressure for recirculation per unit length of the thixotropic cement system column;
      (j) estimating a maximum allowed gel strength; and
      (k) estimating a time to reach the maximum allowed gel strength;
   (3) designing and testing the thixotropic cement system to confirm adherence to the determined rheology model;
   (4) pumping the designed and tested thixotropic cement system to the loss zone.

13. The method of claim 12, further comprising the step of confirming that the thixotropic cement system can be pumped directly through a bottom hole assembly or that tripping is required.

14. The method of claim 13 further comprising the step of estimating the pressure for recirculation per unit length of the thixotropic cement system.

15. The method of claim 14, further comprising the step of confirming that residual thixotropic cement system, after a maximum allowable down time with attained gel strength, can be circulated back out of the bore hole after treating the loss zone.

16. The method of claim 15, wherein the step of determining whether the residual thixotropic cement system with attained gel strength can be circulated back out of the bore hole after treating the loss zone comprises the steps of:
   designing the thixotropic cement system with desired rheological behavior;
   confirming rheology readings;
   performing an on-off test of the thixotropic cement system to confirm that the thixotropic cement system will regain pumpable viscosity after circulation is stopped; and
   performing acid solubility tests on the thixotropic cement system.

17. The method of claim 15, further comprising the steps of:
   confirming that the thixotropic cement system can be pumped using a rig pump;
   determining a time needed to swap the rig pump and a cement pump;
   estimating a tripping time;
   pumping the thixotropic cement system into the loss zone; and
   allowing the thixotropic cement system to enter a quasi-static or no flow period.

* * * * *